United States Patent Office 3,600,430
Patented Aug. 17, 1971

3,600,430
PURIFICATION OF DIESTERS OF BENZENE
DICARBOXYLIC ACIDS
Preston K. Martin and Bobby J. Bland, Corpus Christi, Tex., assignors to Celanese Corporation, New York, N.Y.
No Drawing. Filed Mar. 22, 1968, Ser. No. 715,202
Int. Cl. C07c 69/80, 69/82
U.S. Cl. 260—475PR                                12 Claims

ABSTRACT OF THE DISCLOSURE

A process for the purification of a diester of a benzene dicarboxylic acid, e.g. bis(2-hydroxyethyl) terephthalate, by mixing a mononuclear aromatic hydrocarbon or a halohydrocarbon solvent with an insoluble amount of molten diester, followed by separating the resulting two phases and recovering purified diester from the lighter of the two phases.

BACKGROUND OF THE PRESENT INVENTION

The present invention relates to a process for the purification of diesters of benzene dicarboxylic acids. More particularly the present invention relates to a process for the removal of color formers from crude diesters of benzene dicarboxylic acids.

Diesters of benzene dicarboxylic acids are well known and are generally obtained by reacting alkylene oxide, such as ethylene oxide, or an alcohol with the dicarboxylic acid. For example see U.S. Pat. 3,037,049. These monomeric diesters may be converted to polymers such as polyethylene terephthalate which can be used for industrial yarn, staple fiber and the like. When used for the production of polymers, a diester material of high purity is generally required and in particular it is desirable to have the monomeric diester starting material free of color formers. The term "color formers" as used herein is meant to include materials which themselves are colored, thus lending color to the monomeric diester, as well as materials which can cause discoloration of polymers formed from these diesters. All of the color formers have not been identified and therefore the applicants do not wish to be limited as to which impurities do contribute to discoloration. However, it appears that aldehydes and basic salts (such as amine salts) are impurities in a diester which contribute to the discoloration of a polymer formed therefrom. Generally such aldehydes are present as impurities in the benzene dicarboxylic acid used to prepare the diester and are carried over to the diester product. The nitrogen bodies in the diester may derive, for example, from a tertiary amine esterification catalyst, or perhaps be present in the diacid starting material such as when the acid has been derived from springing from a basic solution.

Various processes have been devised in order to purify diesters of benzene dicarboxylic acids such as treatment with a sulfite or bisulfite treating agent as disclosed in U.S. 3,239,556 or by treatment with activated charcoal as disclosed in the same patent. Other methods include hydrogenation (French Pat. 1,479,925), and treatment with sodium hyposulfite (British Pat. 760,027). These methods are capable of providing a high purity diester however in view of the growing importance of polyesters, newer methods are constantly being sought for purification of the monomeric diester starting material.

SUMMARY

It is thus an object of the present invention to provide a process for the purification of diesters of benzene dicarboxylic acids. Another object of the present invention is to provide a process for the removal of impurities in diesters of benzene dicarboxylic acids which contribute to discoloration of polymers formed therefrom. An additional object of the present invention is to provide a process for the purification of crude bis(2-hydroxyethyl) terephthalate.

These and other objects are accomplished by the present invention which in one of its embodiments is a process for the purification of crude diesters of benzene dicarboxylic acids comprising (1) intimately mixing a liquid solvent comprised mainly of a mononuclear aromatic hydrocarbon free of ethylenic and acetylenic unsaturation, mononuclear aromatic halohydrocarbon free of ethylenic and acetylenic unsaturation or mixtures thereof with a liquid comprising mainly molten diester of a benzene dicarboxylic acid, the amount of diester present being greater than that amount which is soluble in the liquid solvent at the temperature of mixing, (2) allowing the resulting mixture to separate into a light liquid phase and a heavy liquid phase, said light liquid phase being comprised mainly of said liquid solvent having a small amount of diester dissolved therein and said heavy liquid phase being comprised mainly of molten diester combined with a small amount of liquid solvent, and (3) separating said light liquid phase from said heavy liquid phase and recovering purified diester of a benzene dicarboxylic acid from said light liquid phase.

DESCRIPTION OF THE PREFERRED
EMBODIMENTS

As may be seen the first step in purifying a crude diester according to the present invention is the intimate mixing of the molten crude diester with a particular liquid solvent, the amount of crude diester being such that the solubility limits of the diester in the solvent are exceeded. As a result of there being an excess of diester two liquid phases will form, the lighter of which will be comprised mainly of solvent (e.g. 80–95%) with a minor proportion of diester, i.e. a solution of diester in the solvent. The heavy phase, which will sometimes hereafter be referred to as the molten diester phase, will be composed mostly of molten diester but will also contain some of the solvent. The heavy phase might also be described by some as a solution of the liquid solvent in the diester, molten diester saturated with liquid solvent, solvent saturated diester, or the like. It might be pointed out, however that the presence of the solvent does depress the melting point of the crude diester. For example, where bis(2-hydroxyethyl) terephthalate which has a melting point of about 110–114° C. is purified using a mixed xylene solvent, the heavy phase will remain liquid as low as about 100° C.

The temperature to be used in the mixing step of the present invention should of course be such that the two phases resulting from the mixing remain liquid and should generally be below 200° C. It will generally be necessary to preheat the liquid solvent prior to mixing it with the molten diester in order to avoid cooling the molten diester phase to below its melting point. Whether the preheating of the liquid solvent is necessary will of course depend on how hot the molten diester is and on how much solvent is being mixed with the molten diester. Preferably the mixing temperature is above the melting point of the dry crude diester. For bis(2-hydroxyethyl) terephthalate purification, for which the present invention is especially suitable, the mixing temperature is preferably between 110° C. and 160° C. The pressure utilized in the present process should be sufficient to maintain the components being mixed as liquids and may vary from subatmospheric to superatmospheric. Preferably the pressure is from atmospheric to about 400 p.s.i.g.

When mixing the solvent with the liquid comprised totally of or mainly of molten diester, the only requirement as to the amount of solvent is that it be less than that amount which will dissolve all of the crude diester. However it is preferred that an amount of solvent be used such that the ratio of diester dissolved in the solvent, i.e. the lighter phase, to the diester in the heavy or molten diester phase is less than about 48:1 and preferably less than about 24:1. In other words at least about 2%, and preferably at least 4%, of the diester should remain in the heavy phase after mixing the molten diester with the solvent.

The present process may be carried as a batch process or as a continuous process in various types of equipment. Thus the process could be carried out as a continuous process in a series of a mixer settlers. If the process is carried out as a batch process the purification can be carried out in a single mixing step or in a series of additions of solvent and withdrawals of the light phase. For example the solubility of bis(2-hydroxyethyl) terephthalate in o-chlorotoluene is about 9 grams diester per 100 grams of solvent at 130° C. Therefore if it were desired to purify 100 grams of crude bis(2-hydroxyethyl) terephthalate at 130° C. using an o-chlorotoluene solvent, about 1050 grams of solvent could be added to and mixed with the melted crude in order to dissolve all but about 5% of the crude, followed by separation of the light phase and recovery of the diester therefrom. Alternatively about 525 grams of solvent could be added to the 100 grams of melted crude, mixed, and the resulting light phase separated therefrom followed by addition of another 525 grams to the remaining heavy phase followed by separation of the light phase resulting from this second addition of solvent. In such cases where a mass of crude diester is treated such that there is a succession of additions and separations, the heavy or melt phase (which becomes smaller upon each addition and separation) generally can be observed to become darker and darker with each addition and separation because the color formers are becoming concentrated in the heavy phase. As has been pointed out above, when a mass of crude diester is being treated in accordance with the present invention, the heavy phase remaining after one or a plurality of mixing and separation steps should generally contain at least about 2% and preferably at least about 4% of the original mass of diester. When only 2 to 4% of the original crude diester remains, it will have usually become so discolored and impure that the affinity of the impurities for the heavy phase will have been reduced to such an extent that further treatment is not economical. It is pointed out however that as long as some heavy phase remains, there would be some degree of purification obtained by the present process even though it be small. A small amount of impure diester remaining after treatment can be discarded or purified by other methods.

The diesters of benzene dicarboxylic acids which may be treated according to the present invention in general may contain from about 10 to 20 carbon atoms and are the alkyl, haloalkyl or oxygen-substituted alkyl diesters of benzene dicarboxylic acids. By oxygen substituted alkyl is meant hydroxy or carbonyl substitution such as

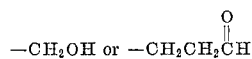

For example the diesters could be the methyl, ethyl, propyl, 2-hydroxyethyl, 2-chloropropyl, 2-hydroxypropyl, or 4-hydroxybutyl diesters of a benzene dicarboxylic acid. The benzene dicarboxylic acid from which the diester is derived may be an unsubstituted benzene dicarboxylic acid, i.e. o-phthalic, isophthalic, or terephthalic acid, or it may be a benzene dicarboxylic acid having alkyl or halo substituents such as 2-chloroterephthalic acid, 3-bromophthalic acid and 2-methyl isophthalic acid. Some specific esters that may be purified include dimethyl terephthalate, bis(2-hydroxyethyl) terephthalate, bis(2-hydroxyethyl) isophthalate, dibutyl phthalate and the bis-(2-hydroxyethyl) ester of 3-bromophthalic acid. Preferably the present invention is applied to bis-hydroxyalkyl esters of an unsubstituted benzene dicarboxylic acid, especially bis(2-hydroxyethyl) terephthalate.

The liquid solvent to be used in the present invention may be comprised mainly of a mononuclear aromatic hydrocarbon free of ethylenic and acetylenic unsaturation, a mononuclear aromatic halohydrocarbon free of ethylenic and acetylenic unsaturation or mixtures thereof. Compounds having unsaturation such as styrene may be present in small amounts but preferably are not present at all. Preferably the solvent contains from 6 to 11 carbon atoms. Some specific solvents suitable for use in the present invention include xylene (including ortho, meta, para and mixtures thereof), ethyl benzene, cumene, toluene, benzene, o-chlorotoluene, chlorobenzene, 1,2,3-trimethylbenzene, 1,3,5-trimethylbenzene, n-propylbenzene, 1-ethyl-3-methylbenzene, and 1,3-dichlorobenzene. The preferable solvents are the $C_7$ to $C_9$ alkyl aromatic hydrocarbons such as xylene, toluene, and cumene.

After separation of the light phase from the heavy phase, various methods may be used for recovery of the purified diester from the light phase and the particular manner of accomplishing this separation does not constitute a part of this invention. One of the most obvious methods is to cool the solution of diester in the solvent so as to crystallize the diester followed by recovery of the crystals by filtration. Other methods include distillation, extraction of the diester from solution in the liquid solvent into a different solvent, e.g. water, and the like.

The following examples are offered to illustrate specific embodiments of the present invention.

EXAMPLE I

At a temperature of about 130° C., 10 grams of crude molten bis(2-hydroxyethyl) terephthalate was mixed with about 100 milliliters of cumene and then two phases were allowed to separate. The upper or lighter phase was decanted from the lower phase and then an additional 100 milliliters of cumene mixed with the lower phase. After again allowing two phases to separate the light phase was decanted and another 100 milliliters cumene added to and mixed with the remaining heavy phase. The light phase resulting from the third addition of cumene was decanted leaving behind the dark colored lower phase which was about 0.5 gram of a crude residue comprised of molten terephthalate saturated with solvent. The three light phases withdrawn as described above were combined and then cooled so as to crystallize the terephthalate therefrom and the crystals recovered and analyzed. Analysis of the original crude bis(2-hydroxyethyl) terephthalate showed it to contain about 310 p.p.m. nitrogen and 2186 p.p.m. aldehyde while the recovered diester crystals contained only about 18 p.p.m. nitrogen and 352 p.p.m. aldehydes.

EXAMPLE II

The procedure of Example I was repeated except that the solvent utilized was a $C_8$ alkylbenzene solvent comprised of about 20% o-xylene, 38% m-xylene, 20% p-xylene, 20% ethylbenzene and 2% toluene and benzene. The crystals recovered from the purification process contained about 19 p.p.m. nitrogen and 486 p.p.m. aldehydes.

EXAMPLE III

The procedure of Example I was substantially repeated on a crude bis(2-hydroxyethyl) terephthalate containing about 280 p.p.m. nitrogen, 1000 p.p.m. aldehydes, and 480 p.p.m. of the hydroxyethyl ester of p-toluic acid. However in this experiment the solvent utilized was ethylbenzene and only two portions of 100 milliliters each were added. The product recovered from the light phase contained about 15 p.p.m. nitrogen, 474 p.p.m. aldehydes and less than 20 p.p.m. of the hydroxyethyl ester of p-toluic acid.

EXAMPLE IV

At a temperature of about 100° C., 10 grams of crude bis(2-hydroxyethyl) terephthalate was added to and mixed with 100 milliliters chlorobenzene. The resulting two phases were allowed to separate and the light phase decanted from the heavy phase. An additional 80 milliliters of chlorobenzene was added and mixed with the remaining heavy phase and then the light phase resulting from the second addition of chlorobenzene was separated and mixed with the light phase withdrawn after the first addition of chlorobenzene. The combined light phases were cooled to about 25° C. so as to crystallize the terephthalate from the solution in the chlorobenzene and the crystals recovered and dried. Comparison of the analyses of the crude diester and the purified product show the nitrogen content to have dropped from 280 p.p.m. to 96 p.p.m. and the aldehyde content to have dropped from 1100 p.p.m. to 380 p.p.m.

EXAMPLE V

The procedure of Example IV was repeated at 120° C. utilizing two additions of o-chlorotoluene, each addition being 100 milliliters. The purified diester product recovered from the light phases contained about 45 p.p.m. nitrogen and 315 p.p.m. aldehydes.

EXAMPLE VI

Ten grams of crude bis(2-hydroxyethyl) terephthalate was added to and mixed with about 58 milliliters of o-chlorotoluene at 153° C. The mixture was allowed to separate into two phases and the lighter of these two phases decanted from the heavy phase which was of about 0.5 gram and brown in color. The decanted lighter phase was then cooled to effect crystallization of the diester therefrom and the diester crystals recovered by filtration. The original crude diester corresponded to that of Examples IV and V while the recovered diester product contained about 185 p.p.m. nitrogen and 510 p.p.m. aldehydes.

EXAMPLE VII

A vertical glass column having openings in the bottom and top as well as a side opening about one-third of the way from the bottom of the column was used to purify about 1700 grams of crude bis(2-hydroxyethyl) terephthalate. At the start of the run, about the lower one-fourth of the column was filled with molten bis(2-hydroxyethyl) of the column and then hot (130° C.) liquid $C_8$ alkylbenzene solvent (corresponding to that of Example II) was continuously introduced into the bottom of the column. Because of the differences in specific gravity, the $C_6$ alkylbenzene solvent passed upwardly through the molten diester and eventually passed out the top of the column. Simultaneously with the introduction of the hot $C_8$ solvent, more crude molten diester at 130° C. was introduced into the side of the column, the rate of introduction of the melt being sufficient to maintain about the lower one-fourth of the column as a molten diester phase. After all 1700 grams of the crude terephthalate had been introduced into the column, the introduction of the $C_8$ solvent into the lower end of the column was continued until the melt phase was reduced to about 40 grams or 2.2% of the original crude diester being purified. The effluent which had been removed from the top of the column consisted of a substantially saturated solution of the diester in the $C_8$ solvent (about 8% by weight diester). Cooling of the solution removed from the top of the column to about 50° C. gave white bis(2-hydroxyethyl) terephthalate crystals which contained about 29 p.p.m. nitrogen, 1000 p.p.m. aldehydes, and 380 p.p.m. hydroxyethyl ester of p-toluic acid. The crude terephthalate starting material purified by this process contained about 300 p.p.m. nitrogen, 1200 p.p.m. hydroxyethyltoluate, and 2,200 p.p.m. aldehydes.

The embodiments of the invention in which an exclusive property or privilege is claimed are defined as follows:

1. A process for the purification of alkyl, haloalkyl, hydroxyalkyl and carbonylalkyl diesters of benzene dicarboxylic acids having from 10 to 20 carbon atoms, said acids being unsubstituted or having nuclear alkyl or halo substituents, and said esters containing an aldehyde or nitrogen compound as an impurity, said process comprising (1) intimately mixing a liquid solvent with a liquid comprising mainly molten diester of said benzene dicarboxylic acid, the amount of diester present being greater than the amount which is soluble in the liquid solvent at the temperature of mixing, said solvent being comprised mainly of a mononuclear aromatic hydrocarbon free of ethylenic and acetylenic unsaturation, a mononuclear aromatic halohydrocarbon free of ethylenic unsaturation or mixtures thereof, (2) allowing the resulting mixture to separate into a light liquid phase and a heavy liquid phase, said light liquid phase being comprised mainly of said liquid solvent having a small amount of diester dissolved therein and said heavy liquid phase being comprised mainly of molten diester combined with a small amount of liquid solvent, and (3) separating said light liquid phase from said heavy liquid phase and recovering purified diester of a benzene dicarboxylic acid from said light liquid phase.

2. The process of claim 1 wherein said liquid solvent comprises a $C_7$ to $C_9$ alkyl aromatic solvent.

3. The process of claim 1 wherein said diester is dimethyl terephthalate.

4. The process of claim 1 wherein said diester is a bis-hydroxyalkyl ester of an unsubstituted benzene dicarboxylic acid.

5. The process of claim 4 wherein the amount of said liquid solvent is such that at least 2% of the diester remains in said heavy liquid phase.

6. The process of claim 4 wherein the diester is bis(2-hydroxyethyl) terephthalate.

7. The process of claim 6 wherein the temperature of mixing is about 110 to 160° C.

8. The process of claim 7 wherein the liquid solvent consists essentially of a $C_7$ to $C_9$ alkyl aromatic solvent.

9. The process of claim 8 wherein the recovery of the purified diester from the light liquid phase is by crystallization.

10. The process of claim 8 wherein the crude diester being purified contains nitrogen-containing impurities and the recovered purified diester contains less nitrogen-containing impurities than said crude diester.

11. The process of claim 8 wherein the amount of liquid solvent is such that at least 2% of the diester remains in the heavy liquid phase.

12. The process of claim 11 wherein said liquid solvent consists essentially of a $C_8$ alkyl aromatic solvent.

References Cited

UNITED STATES PATENTS

| | | | |
|---|---|---|---|
| 3,414,608 | 12/1968 | Fujita et al. | 260—475P |
| 3,461,154 | 8/1969 | Lafont | 260—475P |

LEWIS GOTTS, Primary Examiner

E. J. SKELLY, Assistant Examiner

U.S. Cl. X.R.

260—475B

PO-1050
(5/69)

UNITED STATES PATENT OFFICE
CERTIFICATE OF CORRECTION

Patent No. 3,600,430          Dated August 17, 1971

Inventor(s) Preston K. Martin et al

It is certified that error appears in the above-identified patent and that said Letters Patent are hereby corrected as shown below:

Please correct the following error:

On page 3, column 5, line 50, please replace "$C_6$" with --$C_8$--.

Signed and sealed this 25th day of July 1972.

(SEAL)
Attest:

EDWARD M. FLETCHER, JR.           ROBERT GOTTSCHALK
Attesting Officer                 Commissioner of Patents